US008702816B2

(12) United States Patent
Conte

(10) Patent No.: US 8,702,816 B2
(45) Date of Patent: Apr. 22, 2014

(54) COMPOSITIONS AND METHODS FOR REVERSIBLY DYEING SOFT CONTACT LENSES

(76) Inventor: Michael D. Conte, Fort Worth, TX (US)

( * ) Notice: Subject to any disclaimer, the term of this patent is extended or adjusted under 35 U.S.C. 154(b) by 295 days.

(21) Appl. No.: 13/084,825

(22) Filed: Apr. 12, 2011

(65) Prior Publication Data

US 2012/0091368 A1   Apr. 19, 2012

Related U.S. Application Data

(63) Continuation-in-part of application No. 11/712,685, filed on Mar. 1, 2007, now abandoned.

(60) Provisional application No. 60/779,287, filed on Mar. 3, 2006.

(51) Int. Cl.
*D06P 5/00* (2006.01)

(52) U.S. Cl.
USPC .................. 8/507; 351/159.73; 250/492.1

(58) Field of Classification Search
USPC ............... 252/492.1; 8/507–549; 351/159.73
See application file for complete search history.

(56) References Cited

U.S. PATENT DOCUMENTS

| | | | |
|---|---|---|---|
| 3,476,499 A | 11/1969 | Wichterle | |
| 4,632,055 A * | 12/1986 | Ryder et al. | ................. 118/703 |
| 4,736,872 A | 4/1988 | Ryder et al. | |
| 4,777,684 A | 10/1988 | Johnson | |
| 4,840,477 A | 6/1989 | Neefe et al. | |
| 4,891,046 A | 1/1990 | Wittman et al. | |
| 5,302,978 A | 4/1994 | Evans et al. | |
| 6,420,455 B1 | 7/2002 | Landgrebe et al. | |
| 2003/0225381 A1 | 12/2003 | Dalen et al. | |
| 2004/0220537 A1 | 11/2004 | Embleton et al. | |
| 2011/0230589 A1* | 9/2011 | Maggio et al. | ................. 523/107 |

FOREIGN PATENT DOCUMENTS

| | | | | |
|---|---|---|---|---|
| DE | 102004047156 A1 * | 3/2006 | ............. | G02C 11/00 |
| GB | 1 583 492 A | 1/1981 | | |
| GB | 2 319 631 A | 5/1998 | | |
| GB | 2202962 A * | 10/1998 | ............... | G02C 7/04 |
| JP | 2004286875 A2 | 10/2004 | | |

OTHER PUBLICATIONS

European Patent Office, International Search Report, Application No. PCT/US2007/005293, Sep. 5, 2007.
European Patent Office, International Preliminary Report on Patentability, Application No. PCT/US2007/005293, Jun. 11, 2008.

* cited by examiner

*Primary Examiner* — Tri V Nguyen

(57) ABSTRACT

A method and kit for producing reversibly dyed soft contact lenses. The contact lenses are submerged in saline solution and a dye is added to the saline solution, either directly or by means of a strip that has been impregnated with the dye. Preferred dyes include the common dyes sodium fluorescein, lissamine green, and rose bengal. After a period of time, the lens absorbs the dye and can be removed from the solution and placed on the eye. Once the lens is illuminated with ultraviolet light, it will glow or fluoresce. This creates a dramatic effect, particularly in dimly lit areas. The dyeing method does not utilize heat and thus is reversible. Soaking the lens in additional saline solution for a period of time will cause the dye to return to its non-dyed state.

9 Claims, No Drawings

COMPOSITIONS AND METHODS FOR REVERSIBLY DYEING SOFT CONTACT LENSES

This application is a continuation-in-part of and claims priority to U.S. patent application Ser. No. 11/712,685, entitled "DYED SOFT CONTACT LENSES," filed on Mar. 1, 2007, now abandoned having Michael D. Conte listed as the inventor, the entire content of which is hereby incorporated by reference, and which claims priority to U.S. Provisional Patent Application, Ser. No. 60/779,287, entitled "DYED SOFT CONTACT LENSES," filed on Mar. 3, 2006, having Michael D. Conte listed as the inventor, the entire content of which is hereby incorporated by reference.

BACKGROUND

One aspect of this invention pertains to colored, or dyed, hydrogel or silicon hydrogel substrate, and more particularly to compositions and methods for reversibly dyeing soft contact lenses.

Colored contact lenses have been steadily gaining in popularity amongst individuals who want to change their eye color or add a dramatic new feature to their appearance. Contact lens makers first started adding color to contact lens in the 1970s to make the lenses easier to see. The amount of pigment used to create this "handling tint" is so slight that it has essentially no effect on how the lens looks on the eye. By the 1980s, iris-altering contacts had been created. Some offered subtle changes, such as lenses that made blue eyes look bluer. Other, novelty lenses became available that could change the eye's appearance dramatically, such as by turning the iris a blood-red color, for instance, or making it look like a cat's eye.

The simplest colored lenses are enhancing lenses, which look like a regular contact lens with an iris-sized circle of transparent color. These lenses aren't meant to hide the iris's natural color, but rather to augment it. Manufacturers create the color by covalently attaching organic azo dyes to the contact lens polymer. The use of opaque pigments is more difficult, as it has a tendency to look fake. Colored contact makers have gotten better at making dramatic yet realistic-looking changes to the appearance of the iris through the use of sophisticated designs of opaque inorganic pigments. Nano- and microscale particles of inorganic pigments such as titanium dioxide, iron oxide, and barium sulfate are typically used to achieve the opaque color in these lenses. The FDA has only approved a small number of pigments for use with contact lenses. It is also important that the pigment used have no effect on the morphology and overall mechanical properties of the lens.

For some lenses, inks are printed directly onto the lens and then covalently fixed onto the polymer surface. Other colored contact lenses are made by putting the inks into a mold and polymerizing the lens around these pigments, encapsulating the color within the contact. Others are made by stacking layers of dielectric films of alternating low and high refractive index. This, in combination with the films' precise nanoscale thickness, allows scientists to tailor the lens's reflective properties and therefore its color. The thin films are applied to the lens using plasma-enhanced chemical vapor deposition or ion-assisted deposition. The process creates a smooth surface on the lens that's imperceptible to the wearer. All of these processes are complicated and require precise application of pigments or films through the use of highly sensitive and technical machinery.

Colored contact lenses that have a dyed iris area and a light reflecting material on the concave surface of the lens are known. The reactive dyes are attached to the lens through the formation of a covalent bond between the lens material and the dye that is created after the lens is contacted with the dye for a sufficient amount of time. These dyes permanently stain the matrix of the contact lens.

Also known are colored contact lenses in which the color is applied by direct application of one or more vat dyes, by printing the color onto the surface of the lens, or by incorporating a pigment onto the contact lens surface. These contact lenses are also permanently colored.

What is needed, therefore is a simple method and kit for coloring contact lenses that is reversible and not permanent.

SUMMARY

One embodiment of the present invention relates generally to the field of a hydrogel or silicon hydrogel substrate. More particularly, it concerns a method for applying dyes to the surface of a soft contact lens, as well as a kit containing the components for application of a dye to a soft contact lens. The dye is applied in a manner to give a dye that is reversible, fadable, and removable in that it does not permanently stain the lens.

Generally, one aspect of the current invention pertains to a method for reversibly coloring a substrate, such as contact lenses, preferably soft contact lenses. The method can be carried out by a contact lens owner after purchase from a manufacturer. The contact lenses are placed in a preserved saline solution. Next, a strip that has been impregnated with a dye is added to the saline solution in which the lens is being stored. In order to ensure that the dyeing process is reversible, it is important that no heat be applied to the system while the lens is being dyed. After the lens has absorbed or adsorbed the dye, the lens can be inserted into the eye as it would normally be worn by the user. Exposure of the dyed lenses to ultraviolet light causes the lenses to glow. These particular dyes cause the contact lens to fluoresce under fluorescent light, creating a dramatic effect. The dyes do not permanently change the substrate contact lens. The dye does not print color into any part of the contact lens matrix. This effect of dyeing will fade over time by itself as the dye slowly leaches out of the matrix of the lens, or the dying effect can be reversed by soaking the lens in saline solution for an amount of time. A kit containing all of the components to produce such reversible dyed contact lenses is also described.

DETAILED DESCRIPTION OF PREFERRED EMBODIMENTS

One embodiment of the present invention relates to methods and kits that utilize dyes to temporarily color the surface of hydrogel or silicon hydrogel substrate, such as a soft contact lens. The methods and kits produce contact lenses that will fluoresce or glow under fluorescent lights.

Soft contact lenses are also known as hydrogel and silicon hydrogel contact lenses. Soft contact lenses come in four (4) different groups. The first group is low water contact lenses containing less than fifty percent water and non-ionic hydrogel polymers. The second group is high water content lenses that contain over fifty percent water and non-ionic hydrogel polymers. The third group of soft contact lenses is low water contact lenses with less than fifty percent water and ionic hydrogel polymers. The fourth group is high water content lenses with greater than fifty percent water and ionic hydrogel polymers.

Generally, one aspect of the current application pertains to compositions and methods for reversibly dyeing soft contact lenses. The first step in the method comprises placing a soft contact lens in a container filled with saline solution. In the next step, a strip that has been impregnated with a dye is added to the saline solution that contains the soft contact lens, to produce a combination solution. After a period of time, the soft contact lens will absorb or adsorb the dye from the combination solution. Finally, the soft contact lens is removed from the combination solution, rinsed briefly with saline, and placed in the eye. Exposure to ultraviolet light will cause the soft contact lens to glow, especially in dim illumination or a dark room. This effect will fade over time as the dye slowly leaches out of the matrix of the lens, or the lens can be soaked in additional saline for a period of time to reverse the dyeing. The dyes do not permanently change the contact lenses. The dyes do not permanently stain the matrix of the contact lens.

Although many dyes can be used, the dyes for the current invention include sodium fluorescein, lissamine green, rose Bengal, and mixtures thereof. The most preferred dye is sodium fluorescein. The strips onto which the dyes can be absorbed include small paper strips about 2 mm wide and 15 mm long. The dyes can be absorbed or adsorbed by the strips by placing the absorbent paper strips in sodium fluorescein solution. In one embodiment, the strips absorb or adsorb up to about 30 milligrams of dye per strip. If the dye used is rose bengal, the amount of dye can be from about 1 milligram to about 20 milligrams. The amount of dye that is absorbed onto the strip may need to be increased depending on the amount of saline solution in the container. The usable amount of saline is up to about 10 milliliters but can be varied accordingly. An example of a commercially available sodium fluorescein strip is a FUL-GLO® fluorescein sodium sterile ophthalmic strip (Buffalo Grove, Ill.). The strip preferably dissolves in the saline solution to produce a combination solution. The amount of time required for the contact lens to absorb the dye will vary, but the preferable minimum amount of time during which the contact lens should be left in the combination solution is about three hours.

In additional embodiments, the dye used is sodium fluorescein. The sodium fluorescein is added to the strip, or directly to the saline solution, in an amount of about 0.6 mg. The amount of sterile saline solution used is about 0.5 mL. The lens is placed into the saline solution containing the dye.

During the dyeing process, one range of temperature to maintain for the dye, the saline, and the lens is from about 62 to about 72 degrees Fahrenheit. The lens should be allowed to contact the dye and the saline for a period of at least about 6 hours and no longer than about 48 hours. In order to ensure that the dyeing process is reversible, the temperature of the dye, saline, and lens could be between about 45 and about 100 degrees Fahrenheit. In another embodiment, the temperature is in the range of from about 60 to about 82 degrees Fahrenheit. In yet another embodiment, the temperature preferably does not exceed 72 degrees Fahrenheit. Adding heat to the system will result in permanent dyeing that is not easily reversed. By avoiding the addition of heat, the dye does not form a permanent or covalent bond with the contact lens. If the dye is not permanently or covalently attached to the lens, then the dye can fade or be removed from the lens at a later time. The "reversible" dye on the lens can fade within about 48 hours at ambient temperature. The fading is accelerated at higher temperature.

In order to complete the reversing or removing of the dye process, the lens must be soaked in about 5 mL sterile saline solution for about 6 hours. This process should then be repeated twice more with new saline solution. After this, the lens should substantially return to its natural color.

In additional embodiments, the dye that is absorbed or adsorbed by the strip may be a mixture of any useable dyes.

One embodiment of the current invention also pertains to a kit that may be used to dye soft contact lenses. The kit contains four main components. The first component is a contact lens container. The container can be a 10 mL size contact lens cup holder or any other suitable container. The second component is a bottle of preserved saline solution, available from any commercial source. The third component is a strip that has been impregnated with a dye. The dye is preferably sodium fluorescein, lissamine green, or rose bengal. The strips may vary in size and may contain up to about 30 milligrams of dye per strip, depending on the size of the contact lens container and the selected dye. A fourth optional component is a UV light emitting system, such as a light bulb that emits ultraviolet light powered by a battery system.

To utilize the kit, the user deposits a contact lens, preferably a soft contact lens, into the contact lens container. The contact lens is one that has been prescribed by a doctor and obtained from a manufacturer of contact lenses. The container is then filled with saline solution from the bottle of preserved saline solution. The preferred amount of saline solution added is about 10 milliliters. A strip that has been impregnated with dye is then added to the saline solution. If the dye is sodium fluorescein, the strip should preferably contain up to about 30 milligrams of dye. The saline solution used can be up to about 10 milliliters. In some embodiments, about 0.6 mg sodium fluorescein is used in about 0.5 mL saline solution. The strip preferably dissolves in the saline solution to produce a combination solution containing molecules of dye. Alternatively, the dye is added directly to the saline solution, without the use of a strip. In both embodiments, the dye molecules are absorbed by the contact lens over a period of time. The contact lens should be left in the container with the combination solution for between about six hours and about 48 hours. No heat (i.e. the temperature of below about 100° F.) should be applied to the system, rather, the temperature should be maintained between about 60 degrees and about 82 degrees Fahrenheit. A temperature of around 72° F. has been found to work well. After the lenses are placed in the eye, the UV light emitting system should be permitted to shine into the eyes to cause the contact lenses to glow.

The effect of utilizing the kit to produce the dyed contact lenses is that the lenses will fluoresce or glow, especially in dim illumination or a dark room. This creates a dazzling, dramatic effect.

Another embodiment of the present invention pertains to producing a dyed contact lens, or enhancing the glow of a soft contact lens that has already been dyed, while the subject is wearing or using the contact lens. Here, from about 10 to about 20 volume percent of a dye in liquid tears (saline) in about 0.5 ml to about 2 ml single use packages is put directly on the eye with the soft contact lens to either dye the "undyed" contact lens or enhance the glowing of the contact lens that has already been dyed. Usable dyes include sodium fluorescein, lissamine green, rose Bengal, and mixtures thereof.

REFERENCES CITED

The following U.S. Patent documents and publications are hereby incorporated by reference.

U.S. PATENT DOCUMENTS

U.S. Pat. No. 4,840,477 to Neefe et al.
U.S. Pat. No. 5,302,978 to Evans et al.

What is claimed is:

1. A method for producing a reversibly dyed hydrogel or silicon hydrogel substrate, comprising:
   immersing a hydrogel or silicon hydrogel substrate in a saline solution, wherein the hydrogel or silicon hydrogel substrate has a non-dyed appearance, wherein the hydrogel or silicon hydrogel substrate is a soft contact lens;
   adding a dye to the saline solution to produce a combination solution;
   allowing the hydrogel or silicon hydrogel substrate to remain in the combination solution for an amount of time at a temperature from about 60° F. to about 82° F., wherein the dye does not print color into any part of the soft contact lens matrix; and
   removing the hydrogel or silicon hydrogel substrate from the combination solution to produce a reversibly dyed hydrogel or silicon hydrogel substrate, wherein the reversibly dyed hydrogel or silicon hydrogel substrate returns to its non-dyed appearance over time and the dye is removable by soaking in a saline solution.

2. The method of claim 1, wherein the saline solution is in an amount of about 0.5 milliliters.

3. The method of claim 1, wherein the dye is contained in a dye-impregnated strip.

4. The method of claim 1, wherein the dye is sodium fluorescein.

5. The method of claim 4, wherein the sodium fluorescein is added in an amount of about 0.6 milligrams.

6. The method of claim 1, wherein the amount of time is from about 6 hours to about 48 hours.

7. The method of claim 1, further comprising placing the contact lens on an eye and illuminating the eye with ultraviolet radiation.

8. A method for reversibly dyeing a soft contact lens comprising:
   immersing the soft contact lens in about 0.5 milliliters of a saline solution, wherein the hydrogel or silicon hydrogel substrate has a non-dyed appearance;
   adding about 0.6 milligrams of sodium fluorescein dye to the saline solution to produce a combination solution;
   allowing the contact lens to remain in the combination solution for an amount of time from about 6 hours to about 48 hours at a temperature from about 62 degrees Fahrenheit to about 72 degrees Fahrenheit, wherein the sodium fluorescein dye does not print color into any part of the soft contact lens matrix; and
   removing the contact lens from the combination solution to produce a reversibly dyed contact lens, wherein the reversibly dyed contact lens returns to its non-dyed appearance over time and the sodium fluorescein dye is removable by soaking in a saline solution.

9. The method of claim 8, further comprising the step of soaking the dyed contact lens in about 5 milliliters of saline solution for about six hours, then repeating this step twice with new saline solution, to reverse the dyeing of the contact lens.

* * * * *